UNITED STATES PATENT OFFICE.

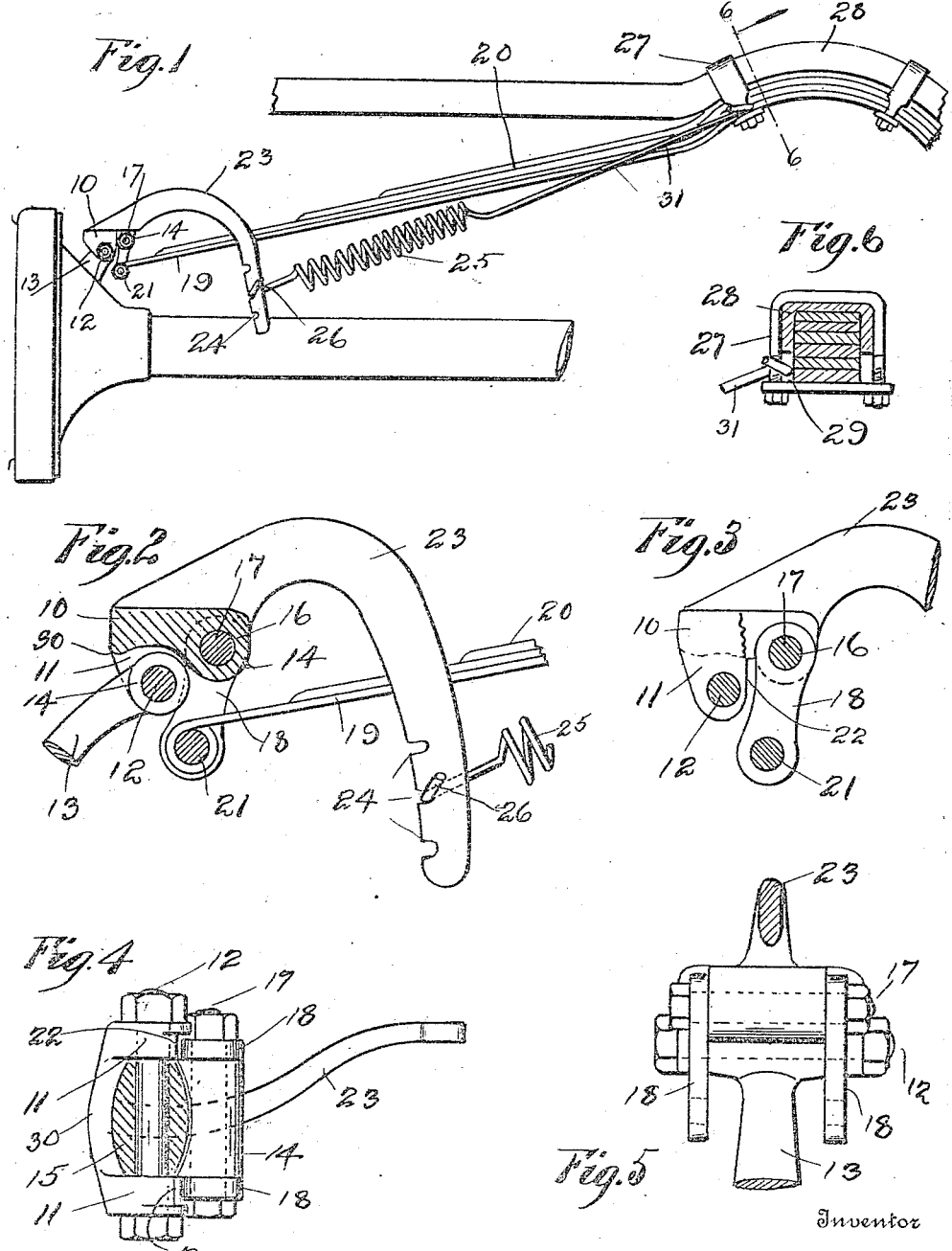

EUGENE FULLER, OF ARCTIC, RHODE ISLAND, ASSIGNOR TO BENJAMIN F. TEFFT, JR., OF ARCTIC, RHODE ISLAND.

SHOCK-ABSORBER.

1,267,537.    Specification of Letters Patent.    Patented May 28, 1918.

Application filed April 30, 1917.  Serial No. 165,361.

*To all whom it may concern:*

Be it known that I, EUGENE FULLER, a citizen of the United States, and resident of the village of Arctic, in the county of Kent and State of Rhode Island, have invented certain new and useful Improvements in Shock-Absorbers, of which the following is a specification.

This invention relates to shock absorbing devices of the class employing auxiliary springs for the purpose of absorbing the shocks and jars due to travel over rough roads.

One of the objects of this invention is to provide an improvement in the spring suspension for the vehicle which is that of pivoting a rocker member on a vehicle element and shackling the end of the main spring to said member at a point slightly offset from its connection to said element, whereby the spring shackle connections already on the car may be utilized, thus reducing to the minimum both the cost and labor of installing such devices.

A further object of the invention is to provide a lever arm on this interposed rocker member to which a tension spring is connected, for the purpose of yieldably supporting this rocker and providing additional yieldability to the main spring.

A still further object of the invention is to so arrange the parts that one end of this tension spring may be connected to the main spring securing bracket, which bracket is naturally so formed as to readily receive the end of such spring.

A still further object of the invention is to provide means in the lever arm of this rocker member, whereby the tension spring may be shifted so that the effective operating length of said arm may be readily adjusted to accommodate different loads.

The invention further consists in the provision of a stop on this rocker member for limiting its upward or rebounding stroke.

With these and other objects in view, the invention consists of certain novel features of construction, as will be more fully described, and particularly pointed out in the appended claims.

In the accompanying drawings:

Figure 1— is an end view of a portion of the vehicle showing my improved shock absorbing device as applied thereto.

Fig. 2— is an enlarged view of the shock absorbing device showing the rocker member partially in section and mounted in operative position on the usual shackle bracket used on a certain style of car.

Fig. 3— is a side elevation of a portion of the rocker member.

Fig. 4— is a view of the under side of this rocker member showing the shackle bracket in section and showing the offset of the lever arm.

Fig. 5— is an end view of this rocker member with the shackles in position thereon but with the main spring removed.

Fig. 6— is an end view of the main spring in section on line 6—6 of Fig. 1, and showing the bracket which connects the spring to the body bar and showing the naturally formed opening in this bracket adapted to receive the end of the tension spring of my shock absorbing device.

The primary object of this invention is the provision of an effective shock absorbing device, and secondly to provide such a device that is particularly adapted to be attached to a certain make of car and so arranged as to fit the parts already on the car and to utilize all of the regular spring suspension parts, whereby it will take but a very few moments to position a set of these devices on a car; and so reduce the cost of the device and the cost of applying the same, to the very minimum.

In accomplishing these objects, I provide a spring supporting rocker member 10 comprising a body portion having a pair of downwardly extending ears 11 on its opposite edges adapted to receive the bolt 12 which also passes through the regular standard shackle bracket 13.

The body portion of this rocker member is also provided with a downwardly extending boss 14 on its front edge, the same being of a width substantially that of the length of the hub portion 15 of the shackle bracket 13. This boss is provided with a bolt hole 16 therethrough, which latter hole is offset slightly from the axis of the bolt 12, both in a vertical and also in a horizontal direction, and through this hole 16 is passed the bolt 17 which also extends through the pair of shackles 18, to the opposite ends of which is connected the end 19 of the main spring 20 by means of its regular bolt 21.

This car to which my device is designed to be attached is originally constructed with the shackles 18 hung on the shackle bracket 13, and in order to interpose my rocker member between it and the main spring and still utilize these shackles without disturbing their connection to the main spring 20, it is necessary that their upper ends be connected as near their original position as possible. Therefore I provide a hole 16 in this rocker for the shackle bolt which is just above and slightly inward from its original pivoting point, and by cutting away the inner portion of the ears 11 at the point 22, see Figs. 3 and 4, I provide sufficient room for the shackles to swing and permit the necessary yielding and elongation of the main spring 20.

To this rocker member I have connected a lever arm 23 which extends both forwardly and downwardly therefrom preferably on the arc of a circle. This arm is also offset to one side so as to clear the main spring and near its end it is provided with a plurality of spaced-apart notches 24 on its inner edge to which the tension spring 25 may be connected.

One of the features of this invention is the provision of an elongated tension spring 25, one end of which is provided with a hook 26 adapted to engage any one of these notches 24 in the arm and the opposite end of this spring is provided with an elongated portion 31 adapted to extend up to the clamp member 27 which secures the main spring to the bar 28, and to hook into the space 29, see Fig. 6, between the bar 28 and the bracket 27, which arrangement provides a natural and otherwise unused opening for this hook end.

A feature of this construction is that when it is desired to use this shock absorbing device on a car designed for light loads such for instance as a run-about, the tension spring is hooked into the upper notch in the arm which will provide a short lever arm and a light tension on the spring. When however, this device is applied to a car having a five passenger body, the tension spring will be connected to the second hole, thus slightly increasing the operative length of the lever arm and also increasing the tension of the spring; but when employed on a truck the spring is connected to the lower hole in the arm thus again increasing the operating length of the lever arm and also the tension on the spring, as the distance increases upon approaching the end of the lever.

In order to control the rebounding effect of this rocker member 10, I have provided an over-hanging portion 30, see Fig. 2, on the rear thereof, which portion is designed to bring up against the back of the bracket 13 and so limit the upward swing of its arm 23.

It will be observed by applicant's construction that his shackles 18 rest against the rocker member at the point 22, see Fig. 4, whereby elongation of the main spring due to depression will cause the shackles to swing outward and so produce a positive movement of this rocker arm downwardly and in an outward circular direction, which movement is resisted by the action of the auxiliary spring on the lever arm 23.

To install my improved shock absorber on the particular style of car for which it is designed, it is only necessary to remove the one shackle bolt from its bracket 13, and pass the same bolt through these shackles and through the hole in the rocker, then pass a new bolt 12 through ears 11 in the rocker and the shackle bracket, it is now only necessary to hook one end of the tension spring to the bracket 27 and the other end to the arm 23, and the job is finished, taking less than ten minutes to complete an installation. A pair of these devices may be connected to the rear, and a pair on the front spring if desired.

The foregoing description is directed solely toward the construction illustrated, but I desire to reserve the privilege of resorting to all the mechanical changes to which the device is susceptible, the scope of the invention being limited only by the terms of the appended claims.

I claim:

1. A shock absorbing device comprising a rocker member pivoted to a vehicle element, a main spring clamped adjacent its middle to the vehicle body and shackled at its end to said rocker at a point slightly offset from its connection to said element, means in said rocker for preventing said shackle from swinging outwardly without causing a corresponding rocking movement of said rocker on its pivot, a lever arm on said member extending forwardly and downwardly from said rocker, and an auxiliary spring connecting said arm to a spring supported portion of the vehicle whereby a depression of the main spring causes a positive relative movement of said rocker arm and a consequent elongation of said auxiliary spring.

2. A shock absorbing device comprising a rocker member pivoted to a vehicle element, a main spring clamped adjacent its middle to the vehicle body and shackled at its end to said rocker at a point slightly offset from its connection to said element, means in said rocker for preventing said shackle from swinging outwardly without causing a corresponding rocking movement of said rocker on its pivot, a lever arm on said member extending forwardly and downwardly from said rocker, an auxiliary spring connecting said arm to a spring supported portion of the vehicle whereby a depression of the main spring causes a positive relative movement of said rocker arm and a consequent elongation of said auxiliary spring, and means whereby said auxiliary spring may be adjusted on said arm to simultaneously affect the operating length of the arm and regulate the tension of said spring.

In testimony whereof I affix my signature in presence of a witness.

EUGENE FULLER.

Witness:
HOWARD E. BARLOW.